United States Patent
Schneider et al.

(10) Patent No.: US 8,491,002 B2
(45) Date of Patent: Jul. 23, 2013

(54) AIRBAG COVERS, AIRBAG MODULES INCLUDING SUCH COVERS, AND METHODS OF MAKING AIRBAG COVERS FOR USE WITH AIRBAG MODULES

(75) Inventors: David W. Schneider, Waterford, MI (US); John F. Witt, Jr., Clinton Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/291,717

(22) Filed: Nov. 8, 2011

(65) Prior Publication Data
US 2013/0113191 A1    May 9, 2013

(51) Int. Cl.
*B60R 21/20*    (2011.01)
*B60R 21/215*    (2011.01)
*B60R 21/2165*    (2011.01)

(52) U.S. Cl.
USPC ..................... 280/728.3; 280/728.2

(58) Field of Classification Search
USPC .......................... 280/728.2, 728.3
See application file for complete search history.

(56) References Cited

U.S. PATENT DOCUMENTS

| | | | | |
|---|---|---|---|---|
| 5,348,339 | A * | 9/1994 | Turner | 280/728.3 |
| 5,452,913 | A * | 9/1995 | Hansen et al. | 280/728.1 |
| 5,460,400 | A | 10/1995 | Davidson | |
| 5,580,082 | A | 12/1996 | Shiga et al. | |
| 6,325,407 | B1 * | 12/2001 | Soderquist | 280/728.2 |
| 6,453,535 | B1 * | 9/2002 | Nicholas | 29/413 |
| 6,581,958 | B2 * | 6/2003 | Holtz | 280/728.3 |
| 6,702,319 | B2 | 3/2004 | Sczeburek et al. | |
| 7,841,618 | B2 * | 11/2010 | Idomoto et al. | 280/728.3 |
| 7,878,539 | B2 * | 2/2011 | Maripudi et al. | 280/740 |
| 8,096,578 | B2 * | 1/2012 | Wigger et al. | 280/732 |
| 8,220,735 | B2 * | 7/2012 | Wang et al. | 242/374 |
| 2005/0029789 | A1 * | 2/2005 | Chapman | 280/743.2 |
| 2005/0258624 | A1 * | 11/2005 | Abraham et al. | 280/728.3 |
| 2009/0134611 | A1 * | 5/2009 | Wigger et al. | 280/730.1 |
| 2009/0152842 | A1 * | 6/2009 | Benny et al. | 280/728.3 |
| 2009/0309341 | A1 * | 12/2009 | Pausch | 280/735 |
| 2010/0013199 | A1 * | 1/2010 | Muller | 280/729 |
| 2010/0102541 | A1 * | 4/2010 | Shimizu et al. | 280/728.3 |
| 2012/0175862 | A1 * | 7/2012 | Tracht | 280/730.2 |

FOREIGN PATENT DOCUMENTS

JP    2007125904 A    *    5/2007

* cited by examiner

*Primary Examiner* — Ruth Ilan
*Assistant Examiner* — Darlene P. Condra
(74) *Attorney, Agent, or Firm* — Madson IP, P.C.

(57) ABSTRACT

Airbag covers include a covering portion adapted to at least substantially cover a portion of an airbag housing, and a plurality of tabs positioned to extend at least substantially transverse from the covering portion. The plurality of tabs are adapted to be coupled with a portion of an airbag housing. Each tab comprises an opening therein, and at least one tab of the plurality of tabs comprises at least one tear seam. Airbag modules including such covers further comprise a housing including an inflatable cushion and an inflator disposed at least partially therein. The housing comprises a plurality of cover retention components, each including a portion thereof disposed within an opening of a respective tab of the airbag cover. In forming an airbag cover, a covering portion with a plurality of tabs transversely extending therefrom are formed, and at least one tear seam is formed in at least one tab.

21 Claims, 4 Drawing Sheets

AIRBAG COVERS, AIRBAG MODULES INCLUDING SUCH COVERS, AND METHODS OF MAKING AIRBAG COVERS FOR USE WITH AIRBAG MODULES

TECHNICAL FIELD

The present disclosure relates generally to inflatable airbag cushions for motor vehicles. More specifically, various embodiments of the present disclosure relate to airbag module covers adapted for use in inflatable airbag systems for motor vehicles.

BACKGROUND

Modern motor vehicles typically employ various occupant protection systems that actuate from an undeployed to a deployed state without the need for intervention by the occupant. Such systems often include an inflatable occupant protection system in the form of a cushion or bag, commonly referred to as an "airbag cushion," which is now a legal requirement for many new vehicles in numerous countries. Such airbag cushions are typically installed in various locations in a vehicle and may deploy into one or more locations within the vehicle between the occupant and certain parts of the vehicle interior, such as the doors, steering wheel, instrument panel, dashboard or the like, to prevent or cushion the occupant from forcibly striking such parts of the vehicle interior.

The airbag cushion is conventionally housed in an uninflated and folded condition to minimize space requirements. In the event of an accident, an accelerometer within the vehicle measures the abnormal deceleration and triggers the expulsion of rapidly expanding gases supplied or produced by a device commonly referred to as an "inflator." The expanding gases fill the airbags, which immediately inflate in front of the driver and/or passenger to provide protection from impact against a windshield, dashboard, or other surfaces of the vehicle interior.

Typically, the cushion and inflator are stowed within a housing and positioned behind some type of cover within the vehicle. The cover typically couples to the housing and protects the cushion and inflator from tampering and provides a relatively attractive facade to match the remainder of the vehicle interior. Tear seams formed by stitched openings or thin material sections in the cover may be employed to cause the cover to open in a predictable manner when the cushion inflates.

In some instances, forces between the cover and the housing during deployment may cause one or more portions of the housing to crack or even break free. Such cracks can weaken the housing during deployments, and fragments may potentially become dangerous projectiles having the capability to cause injuries to passengers of the motor vehicle. Therefore, it is desirable to inhibit such cracking and/or breaking of the housing during deployment.

BRIEF SUMMARY

Various embodiments of the present disclosure comprise covers for use with an airbag module. In one or more embodiments, such a cover may include a covering portion adapted to at least substantially cover a portion of an airbag housing. A plurality of tabs may also be included, extending at least substantially transverse from the covering portion. The plurality of tabs may be adapted for coupling with a portion of an airbag housing. Each tab of the plurality of tabs may comprise an opening therein. At least one tab of the plurality of tabs comprises at least one tear seam in a portion thereof.

Additional embodiments of the present disclosure comprise inflatable airbag systems. According to one or more embodiments, such systems may include an inflatable cushion, and an inflator in fluid communication with the inflatable cushion to provide a supply of inflation gas to the inflatable cushion during deployment. The inflatable cushion and the inflator can be at least partially disposed within a housing, which housing may include a plurality of cover retention components. A cover can be included comprising a covering portion disposed over a portion of the housing and covering the inflatable cushion and the inflator. The cover can further include a plurality of tabs, where each tab includes an opening into which a portion of a respective cover retention component of the housing is at least partially disposed. At least one of the tabs from the plurality of tabs may include at least one tear seam comprising a weakened portion of the at least one tab.

Other embodiments of the present disclosure comprise methods of forming an airbag cover adapted for use with an inflatable airbag cushion system. One or more embodiments of such methods may include forming a covering portion adapted to cover a portion of a housing. A plurality of tabs may also be formed to extend at least substantially transverse from the covering portion. Each tab can be formed to include an opening therein. Furthermore, at least one tear seam may be formed in one or more tabs of the plurality of tabs.

BRIEF DESCRIPTION OF THE SEVERAL VIEWS OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

The illustrations presented herein are, in some instances, not actual views of any particular airbag cover, airbag housing or inflatable airbag module, but are merely idealized representations which are employed to describe the present disclosure. Additionally, elements common between figures may retain the same numerical reference designation.

Figure 1:
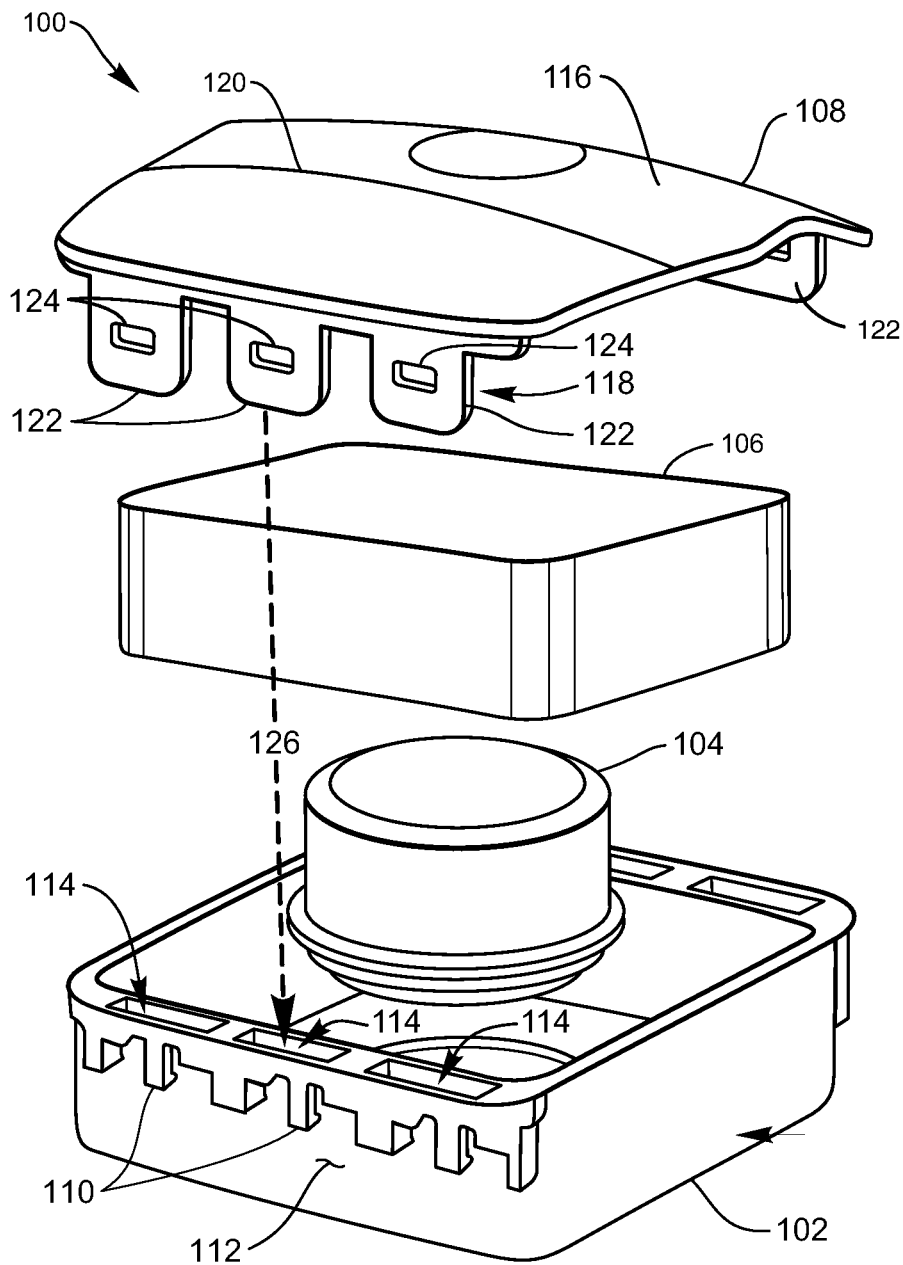
FIG. 1 is an exploded isometric view illustrating select components of an airbag module according to at least one embodiment.

Various embodiments of the present disclosure include covers for an inflatable airbag module adapted to reduce, or even eliminate, cracking and/or fragmentation of the airbag housing. FIG. 1 illustrates select components of an airbag module 100 according to at least one embodiment of the present disclosure. The airbag module 100 includes a housing 102 adapted to receive an inflator 104 and a folded or bundled up inflatable cushion 106 therein. A cover 108 is provided to couple with the housing 102 and at least substantially enclose the inflator 104 and the inflatable cushion 106.

The housing 102 is adapted to be secured to a vehicle structure, such as to a steering wheel. The housing 102 can include a plurality of cover retention components 110 adapted to retain the cover 108 when the cover 108 is coupled to the housing 102. The cover retention components 110 in FIG. 1 are positioned outward from one or more sidewalls 112 of the housing 102, although it should be understood that the cover retention components 110 may be arranged inward or outward of the sidewalls 112, according to various embodiments. The cover retention components 110 are positioned at a distance from the sidewall 112 of the housing 102, and each cover retention component 110 is associated with an insertion slot 114. In at least some embodiments, the housing 102 may be formed in one piece from a synthetic material, such as an injection molded plastic.

The inflator 104 generally comprises a conventional inflator device adapted to generate and/or release a rapidly expanding gas when initiated. For instance, the inflator 104 may comprise a pressurized expandable fluid stored therein, according to some embodiments. In other embodiments, the inflator 104 may comprise a quantity of gas generant adapted to be converted into a supply of inflation fluid during deployment. In yet other embodiments, the inflator 104 may comprise a combination of stored fluid and gas generant, commonly referred to as a "hybrid" inflator.

The inflatable cushion 106 may be positioned in fluid communication with the inflator 104 to enable the rapidly expanding gases to enter into and fill the inflatable cushion 106 upon deployment. The inflatable cushion 106 may be formed according to conventional methods. For instance, the inflatable cushion 106 may comprise a woven fabric formed into the desired shape and configuration according to the particular implementation.

The cover 108 is adapted to be secured to the housing 102. The cover 108 generally includes a covering portion 116 and an attachment portion 118. The covering portion 116 is adapted to at least substantially cover the inflator 104 and the inflatable cushion 106, providing protection to the components and inhibiting tampering with the components. The covering portion 116 can be adapted with a facade adapted to match the remainder of a vehicle's interior. The covering portion 116 can also include a tear seam 120 formed by stitched openings, thin material sections or other means to cause the cover portion 116 to open in a predictable manner when the inflatable cushion 106 inflates during deployment.

The attachment portion 118 comprises a plurality of tabs 122 extending from the covering portion 116. For instance, the plurality of tabs 122 may extend at least substantially transverse from the covering portion 116. Each tab includes an opening 124 formed therein. The opening 124 may comprise an aperture extending through the entire tab 122 in some embodiments, or the opening 124 may comprise a cavity formed in the tab 122 in other embodiments.

Figure 2:
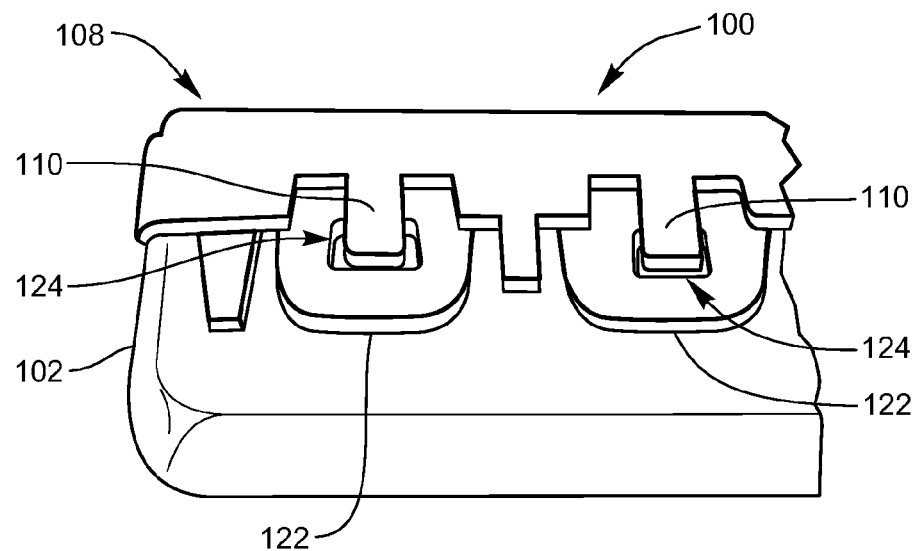
FIG. 2 illustrates a magnified view of the airbag module of FIG. 1 with the housing and the cover coupled together according to at least one embodiment.

When the cover 108 is coupled to the housing 102, the plurality of tabs 122 are each positioned into an insertion slot 114, as shown by arrow 126. When the tabs 122 are disposed within an insertion slot 114, a portion of a cover retention component 110 is disposed within the opening 124 to retain the cover 108 in place. FIG. 2 illustrates a magnified view of an airbag module 100 with the housing 102 and the cover 108 coupled together according to at least one embodiment. As shown, a portion of each cover retention component 110 is disposed within the openings 124 of each of the shown tabs 122. In this manner, the cover retention components 110 can secure the cover 108 to the housing 102 so that the cover 108 is not readily removed from the housing 102.

In the event that the airbag module 100 is deployed and the inflatable cushion is inflated, forces on the cover 108 from the inflatable cushion 106 typically cause the cover 108 to open along the tear seam 120 away from the housing 102. The cover 108 remains coupled to the housing 102 by the cover retention components 110 of the housing 102 being couple with the tabs 122 of the cover 108. In conventional airbag modules, the forces exerted on the cover 108 during deployment, and more specifically between the tabs 122 and the cover retention components 110, can result in cracking or fragmentation of the housing 102. For example, a cover retention component 110 of the housing 102 may crack or even break away from the housing 102 during deployment. Such cracks can weaken the housing 102 during deployments, and fragments may potentially become dangerous projectiles having the capability to cause injuries to passengers of the motor vehicle. In addition, if cracks and/or fragments are sufficiently large, the damage to the housing 102 can result in a loss of a reaction surface to properly position and/or retain the cushion 106 during deployment.

According to at least one feature, one or more of the plurality of tabs 122 of the cover 108 are adapted to fail during deployment in a manner to absorb at least some of the forces between the tabs 122 and the cover retention components 110 so that failure of the housing 102 (e.g., cracking, fragmentation) is reduced, or even eliminated. For instance, one or more of the tabs 122 may include a tear seam strategically positioned thereon according to various embodiments to facilitate failure of the one or more tabs 122 prior to failure of the housing 102. As described herein, a tear seam generally comprises a weakened portion of the tab 122, and may also be referred to as a weakened seam. By way of example and not limitation, the tear seam may be formed as a plurality of perforations formed in the tab 122 material, a scored or thinned material section of a tab 122, an interface where two portions of the tab 122 are bonded together (e.g., glued, stitched, welded, etc.), as well as some combination of the foregoing examples, or any other means for providing a weakened area in a tab 122. According to features of the present disclosure, if a portion of the tab 122 breaks free from the tab as a result of the tear seam, that portion that may break free will move generally away from the passenger area where the cushion is deployed as a result of the forces pushing that portion of the tab away from the passenger area. Accordingly, a portion that may break free from the tab 122 does not become a dangerous projectile that can cause injury to passengers.

Figure 3:
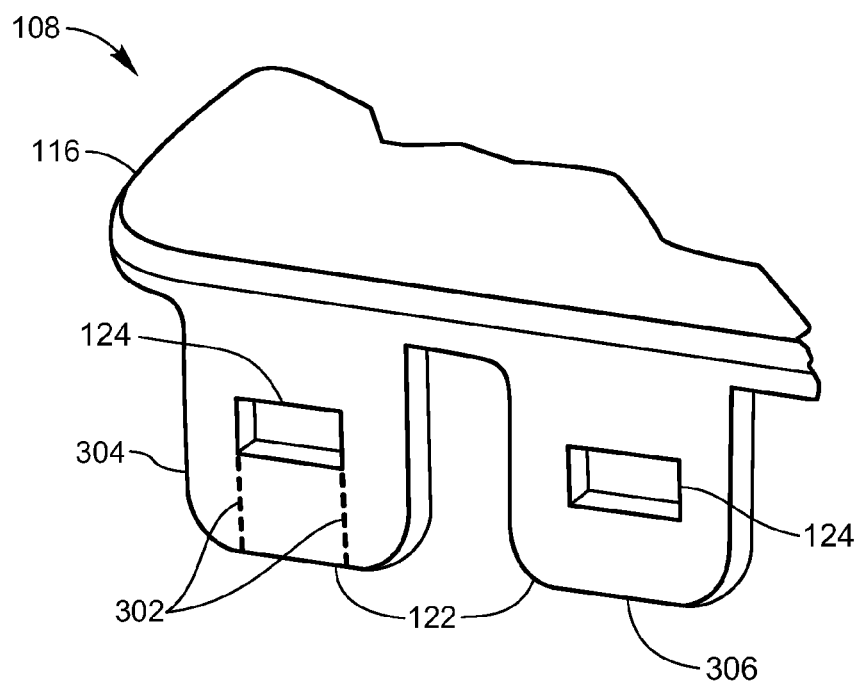
FIG. 3 is a magnified view of a cover illustrating an embodiment comprising tear seams located in a tab and extending from the opening in the tab in a direction away from the covering portion.
Figure 4:
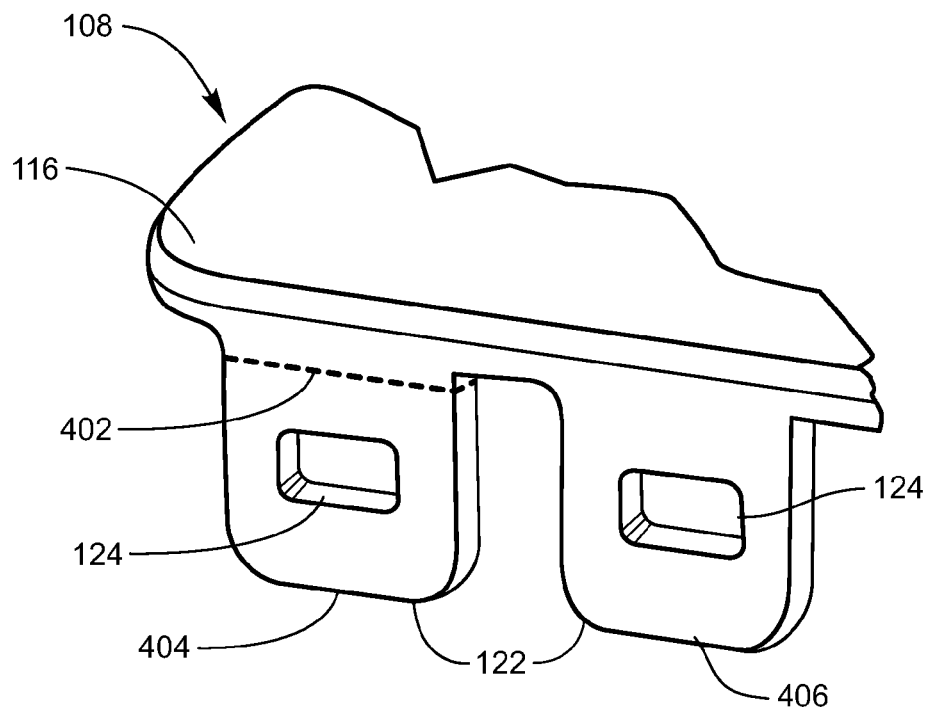
FIG. 4 is a magnified view of a cover illustrating an embodiment comprising a tear seam located in a tab and extending between the tab and the covering portion of the cover.
Figure 5:
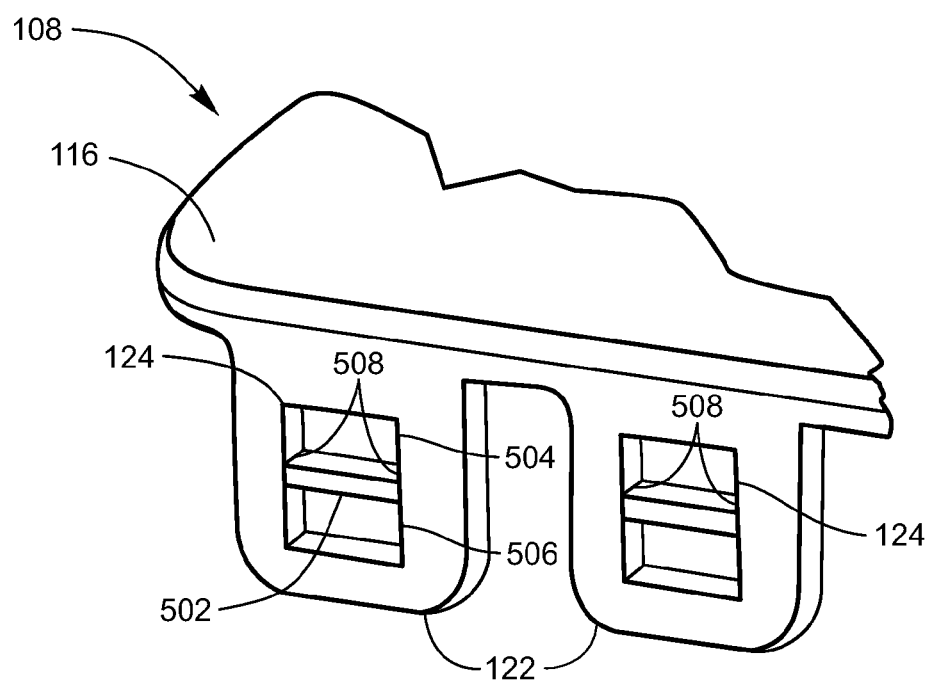
FIG. 5 is a magnified view of a cover illustrating an embodiment comprising a bridge positioned within the opening of the tab.

Turning to FIGS. 3-5, some examples of tear seam configurations are illustrated according to at least some embodiments of the present disclosure. Referring first to FIG. 3, a magnified view of the cover 108 is illustrated according to an embodiment comprising one or more tear seams 302 extending from the opening 124 in the tab 122 in a direction away from the cover portion 116. In the embodiment shown, one of the tabs 122 comprises two tear seams 302 extending substantially parallel to each other. During deployment, a cover retention component 110 disposed at least partially within an opening 124 (as shown in FIG. 2) may be forced against the tab 122. As the forces reach a particular magnitude, the tear seams 302 begin to fail before the cover retention component 110 begins to crack or break. In this manner, at least some of the forces between the tabs 122 and the cover retention component 110 may be absorbed in the tearing of the tear seams 302.

According to at least some embodiments, at least one tab 304 may comprise the tear seams 302, while at least one other tab 306 does not include tear seams. If the tear seams 302 are configured to extend all the way through the tab 304 and are broken all the way through the tab 304 at deployment so that the tab 304 is no longer retained by the respective cover retention component, the other tab 306 will continue to be retained by its respective cover retention component so that the cover 108 does not come free from the housing 102 during deployment, becoming a dangerous projectile. In some embodiments, the tear seams 302 may be configured to extend only partially through the tab from the opening 124. In such a case, the tear seams may be positioned in all of the tabs 122, since no tear seam 302 is adapted to break all the way through the tab 122.

Turning to FIG. 4, a magnified view of a cover 108 is illustrated according to an embodiment comprising a tear seam 402 extending through an area between the tab 122 and the covering portion 116. According to various embodiments, the tear seam 402 may be located in the area generally between the opening 124 and the covering portion 116. During deployment, a cover retention component 110 disposed at least partially within an opening 124 (as shown in FIG. 2) may be forced against the tab 122. As the forces reach a particular magnitude, the tear seam 402 begins to fail before the cover retention component 110 begins to crack or break. In this manner, at least some of the forces between the tabs 122 and the cover retention component 110 may be absorbed in the tearing of the tear seam 402 to inhibit cracking or fragmentation of the housing.

According to at least some embodiments, at least one tab 404 may comprise a tear seam 402, while at least one other tab 406 does not include a tear seam. If the tear seam 402 is broken all the way through the tab 404 at deployment, the other tab 406 will continue to be retained by its respective cover retention component so that the cover 108 does not come free during deployment, becoming a dangerous projectile.

FIG. 5 illustrates another example of a cover 108 comprising a bridge 502 positioned within the opening 124. The bridge 502 extends between the opening 124, effectively dividing the opening 124 into an upper opening 504 and a lower opening 506. It is noted that the terms "upper" and "lower" used in connection with the openings 504 and 506 are only intended to aid in the present description and relate to the orientation of the cover 108 as illustrated in FIG. 5. Such terms are not intended to limit the positions of windows, since it should be evident that different orientations of the cover 108 will change the relationship of the two windows. When the cover 108 is coupled with a housing (such as the housing 102 in FIG. 1), the tab 122 is inserted into an insertion slot 114 and coupled with a cover retention component 110 (as shown in FIG. 1 and as described above) such that the cover retention component 110 is at least partially inserted into the upper opening 504.

A tear seam can be positioned at one or both of the interfaces 508 between the bridge 502 and the opening 124. During deployment, the cover 108 may be pushed away from the housing causing a cover retention component that is disposed at least partially within the upper opening 504 to be forced against the bridge 502. As the forces reach a particular magnitude, the tear seam at one or both of the interfaces 508 between the bridge 502 and the opening 124 begins to fail before the cover retention component begins to crack or break. The bridge 502 can be displaced downward (as oriented in FIG. 5) into the lower opening 506 as the one or more tear seams fail, and at least a portion of the cover retention component 110 may displace at least partially into the lower opening 506. In this manner, at least some of the forces between the tabs 122 and the cover retention component 110 may be absorbed in the displacement of the bridge 502 into the lower opening 506 to inhibit cracking or fragmentation of the housing.

According to at least some embodiments, a plurality of tabs 122, or even all the tabs 122, may comprise a bridge 502. In other embodiments, one or more of the tabs 122 may be devoid of a bridge 502. In either case, if a bridge 502 is broken all the way through during deployment, the tab 122 will continue to be retained by the cover retention component being positioned within the lower opening 506, inhibiting the cover 108 from coming free during deployment and becoming a dangerous projectile.

Figure 6:
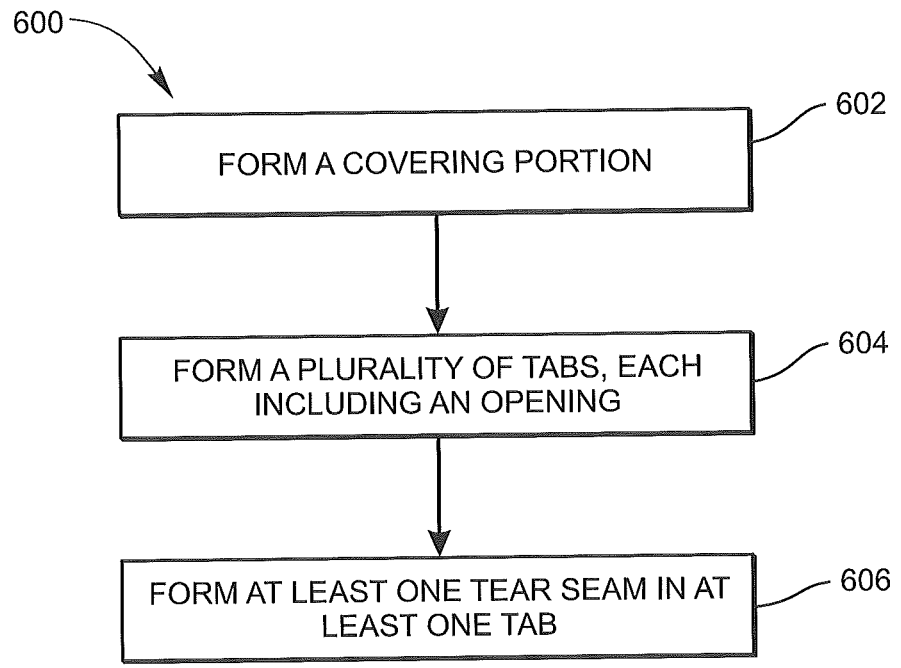
FIG. 6 is a flow diagram illustrating at least one embodiment of a method for forming an airbag cover adapted for use with an inflatable airbag module.

Additional embodiments of the present disclosure relate to methods of forming an airbag cover adapted for use with an inflatable airbag cushion module. FIG. 6 is a flow diagram illustrating at least one embodiment of a method for forming an airbag cover, such as any one of the covers 108 illustrated in FIGS. 1-5. With reference to FIG. 6, the method 600 includes forming a covering portion adapted to cover a portion of a housing at step 602. For example, referring to FIG. 1, a covering portion 116 may be formed to include a size and shape adapted to at least substantially cover a portion of a housing 102.

At step 604, a plurality of tabs may be formed such that the tabs extend at least substantially transverse from the covering portion, and where each tab comprises an opening formed therein. For example, a plurality of tabs 122 may be formed as shown in FIG. 1, where each tab comprises an opening 124. The tabs 122 can be formed, in some implementations, to be integral to the covering portion 116. Furthermore, the tabs 122 can be formed at substantially the same time as the covering portion 116 is formed. For instance, the tabs 122 and the covering portion 116 can be formed in a single mold by injection molding a synthetic material. In other embodiments, the tabs 122 can be formed separate from the covering portion 116. In such embodiments, the tabs 122 can be coupled to the covering portion 116 using, for example, a weld, an adhesive (e.g., solvent, glue, cement), a fastener, etc., as well as a combination of any of the foregoing. In some implementations, at least some of the plurality of tabs 122 may be formed with a bridge 502 positioned within the opening 124, as described above with reference to FIG. 5.

At step 606, one or more tear seams are formed in at least one tab of the plurality of tabs. According to various implementations, the one or more tear seams may be formed generally as a weakened area or section of the at least one tab. By way of example and not limitation, the tear seam may be formed as a plurality of perforations formed in the tab material, a scored or thinned material section of a tab, an interface where two portions of the tab are bonded together (e.g., glued, stitched, welded, etc.), as well as some combination of the foregoing examples, or any other means for providing a weakened area in a tab. In some implementations, at least one or more tabs are formed devoid of any such tear seam.

The at least one tear seam may be positioned at any of a plurality of locations to facilitate failure of the one or more tabs prior to failure of a housing to which the plurality of tabs may be coupled. For example, the at least one tear seam may be formed in a location as described herein above with reference to any of FIGS. 3-5. That is, in at least one implementation, one or more tear seams 302 may be formed to extend from the opening 124 in the at least one tab 122 in a direction away from the covering portion 116, as described above with reference to FIG. 3. In one or more implementations, a tear seam 402 may be formed to extend through an area located between the opening 124 of the at least one tab 122 and the covering portion 116, as described above with reference to FIG. 4. In one or more implementations in which a tab 502 is disposed within the opening 124, a tear seam may be formed at one or both interfaces 508 between the bridge 502 and the opening 124, as described above with reference to FIG. 5.

It is noted, that although the forgoing method 600 is depicted as a flow diagram showing the various steps as a sequential process, many of the forgoing acts can be performed in another sequence, in parallel, or substantially concurrently. In addition, the order of the acts may be re-arranged.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An airbag cover, comprising:
   a molded covering portion adapted to at least substantially cover a portion of an airbag housing; and
   a plurality of tabs extending at least substantially transverse from the covering portion and adapted to be coupled with a portion of an airbag housing, wherein each tab of the plurality of tabs comprises an opening therein and at least one tab comprises at least one tear seam, the configuration of the at least one tear seam being such that during deployment the tearing of the at least one tear seem absorbs at least some of the deployment forces between the plurality of tabs and the airbag housing to inhibit cracking or fragmenting of the airbag housing.

2. The airbag cover of claim 1, wherein the at least one tear seam extends from the opening in the at least one tab in a direction away from the covering portion.

3. The airbag cover of claim 2, wherein the at least one tear seam comprises two tear seams extending parallel to each other in the direction away from the covering portion.

4. The airbag cover of claim 1, wherein the at least one tear seam extends through an area between the opening of the at least one tab and the covering portion.

5. The airbag cover of claim 1, further comprising:
   a bridge extending within the opening of the at least one tab, wherein the at least one tear seam is disposed at an interface between the bridge and the opening.

6. The airbag cover of claim 1, wherein at least one tab of the plurality of tabs is devoid of a tear seam.

7. An inflatable airbag module, comprising:
   an inflatable cushion;
   an inflator in fluid communication with the inflatable cushion to provide a supply of inflation gas to the inflatable cushion during deployment;
   a housing comprising a plurality of cover retention components, wherein the inflatable cushion and the inflator are at least partially disposed within the housing; and
   a molded cover comprising a covering portion disposed over a portion of the housing and covering the inflatable cushion and the inflator, and a plurality of tabs, each tab including an opening into which a portion of a respective cover retention component of the housing is at least partially disposed, wherein at least one tab includes at least one weakened seam comprising weakened portion of the at least one tab, the configuration of the at least one weakened seam being such that during deployment the tearing of the at least one weakened seem absorbs at least some of the deployment forces between the plurality of tabs and the cover retention components of the housing to inhibit cracking or fragmenting of the housing.

8. The inflatable airbag module of claim 7, wherein the at least one tab comprises two weakened seams.

9. The inflatable airbag module of claim 8, wherein each of the two weakened seams extend through the at least one tab in parallel from a location adjacent the opening in a direction toward the housing.

10. The inflatable airbag module of claim 7, wherein the at least one weakened seam extends through the at least one tab at a location between the opening of the at least one tab and the covering portion.

11. The inflatable airbag module of claim 7, wherein the at least one tab further comprises a bridge positioned within the opening, and wherein the at least one weakened seam is disposed at an interface between the bridge and the opening.

12. The inflatable airbag module of claim 11, comprising two weakened seams, one at each interface between the bridge and the opening.

13. The inflatable airbag module of claim 7, wherein at least one tab of the plurality of tabs is devoid of a weakened seam.

14. The airbag cover of claim 7, wherein the at least one weakened seam comprises at least one of a plurality of perforations formed in the at least one tab, a scored or thinned material section of the at least one tab, or an interface where two portions of the at least one tab are bonded together.

15. A method of forming an airbag cover adapted for use with an inflatable airbag cushion module, the method comprising:
   forming a molded covering portion adapted to cover a portion of a housing;
   forming a plurality of tabs extending at least substantially transverse from the covering portion, wherein each tab comprises an opening formed therein; and
   forming at least one tear seam in at least one tab of the plurality of tabs, the configuration of the at least one tear seam being such that during deployment the tearing of the at least one tear seem absorbs at least some of the deployment forces between the plurality of tabs and the housing to inhibit cracking or fragmenting of the housing.

16. The method of claim 15, wherein forming the covering portion and forming the plurality of tabs comprises forming the cover portion and the plurality of tabs as an integral structure.

17. The method of claim 15, wherein forming the at least one tear seam comprises forming the at least one tear seam to extend from the opening in the at least one tab in a direction away from the covering portion.

18. The method of claim 17, wherein forming the at least one tear seam comprises forming two tear seams extending parallel to each other in the direction away from the covering portion.

19. The method of claim 15, wherein forming the at least one tear seam comprises forming the at least one tear seam to extend through an area between the opening of the at least one tab and the covering portion.

20. The method of claim 15, wherein:
 forming the plurality of tabs further comprises forming a bridge within the opening of at least some of the plurality of tabs; and
 forming the at least one tear seam in at least one tab comprises forming the at least one tear seam at an interface between the bridge and the opening.

21. The method of claim 15, wherein forming the plurality of tabs comprises forming at least one tab devoid of a tear seam.

* * * * *